United States Patent [19]

Namekawa

[11] Patent Number: 4,771,789

[45] Date of Patent: Sep. 20, 1988

[54] ULTRASONIC DEVICE FOR MEASURING ACCELERATION OF MOVING REFLECTIVE MEMBER

[75] Inventor: Kouroku Namekawa, Houya, Japan

[73] Assignee: Aloka Co., Ltd., Tokyo, Japan

[21] Appl. No.: 905,746

[22] Filed: Sep. 9, 1986

[30] Foreign Application Priority Data

Sep. 12, 1985 [JP] Japan .................................. 60-200568

[51] Int. Cl.$^4$ ............................................. A61B 10/00
[52] U.S. Cl. ............................. 128/661.09; 73/861.25
[58] Field of Search .................... 128/663; 73/861.25, 73/490, 511; 324/162; 367/91; 364/566

[56] References Cited

U.S. PATENT DOCUMENTS

| | | | |
|---|---|---|---|
| 4,583,409 | 4/1986 | Lannuzel et al. ................. | 73/861.25 |
| 4,622,977 | 11/1986 | Namekawa et al. .......... | 73/861.25 X |
| 4,641,668 | 2/1987 | Namekawa ......................... | 128/663 |

OTHER PUBLICATIONS

Kaveh, M. et al, "Real-Time 2D Doppler Flow Mopping Using Auto-Correlation", Acoustic Imaging, Proc. 13th Intnl. Symp. on Acoustical Imaging, Minneapolis, Minn. 26-28, Oct. 1983, vol. 13, 1984 pp. 447-460, Plenum Press. N.Y.

Namekawa, K., "Ultrasonic Diagnostic Apparatus", Europ. Pat. Appln. No. 0092841, Publ. Nov. 2, 1983.

Magnim, P. et al, "Pulsed Doppler Flow Mapping Apparatus", Eur. Pat. Appln. No. 0212577, Publ. Mar. 4, 1987.

*Primary Examiner*—Francis J. Jaworski
*Attorney, Agent, or Firm*—Koda and Androlia

[57] ABSTRACT

An ultrasonic device for measuring the acceleration of a moving reflective member that is useful in ultrasonic image diagnosis. The device transmits an ultrasonic wave into a living organism and upon receiving the wave reflected by a moving reflective member in the organism, calculates and visually displays the acceleration of the moving reflective member.

The device consists of a complex signal converter for transmitting a periodic pulse modulated wave into a living organism, receiving a reflected signal from a moving reflective member in the living organism and converting the received signal into a complex signal, and an acceleration measurement means having a plurality of complex delay lines with delay equal to an integral multiple of the pulse period, said acceleration measurement means calculating the acceleration of the moving reflective member from the signals output by the complex signal converter and the signals output by the complex delay lines. The acceleration measurement means is an acceleration calculator consisting of a velocity calculator and a difference calculator.

The acceleration of the moving reflective member is derived from the argument of the triple-complex product, or from the difference in the velocities represented by the output of the velocity calculator at two different instants. In either case, the acceleration can be calculated without need to differentiate the velocity. Moreover, in the case of using the triple-complex multiplier, a highly accurate measured value can be obtained, whereas in the case of using a velocity calculator and an acceleration calculator, the structure of the device can be simplified.

4 Claims, 4 Drawing Sheets

ULTRASONIC DEVICE FOR MEASURING ACCELERATION OF MOVING REFLECTIVE MEMBER

BACKGROUND OF THE INVENTION

1. Field of the Invention

This invention relates to an ultrasonic device for measuring the acceleration of a moving reflective member, more specifically to an ultrasonic device for measuring the acceleration of a moving reflective member which detects the acceleration of a reflective member moving within a living organism and measures and displays the detected acceleration.

2. Description of the Prior Art

There are known Doppler devices which transmit a pulse wave of a given fixed pulse-recurrence frequency into a living organism and on the basis of the reflected wave received from a moving reflective member in the living organism, measure the velocity of the moving reflective member. Such devices are used, for example, in ultrasonic diagnostic devices for measuring the flow of blood or the like within the living organism. (See, for example, U.S. Pat. No. 4,573,477.)

However, the flowing blood or other moving reflective member often may not always move at a fixed velocity but may accelerate. Moreover, the acceleration of a flowing fluid such as blood is closely related to the pressure gradient acting thereon, and is thus a valuable source of data for determining pressure difference. Specifically, the acceleration of blood flow within a living organism constitutes useful information indicative of heart function and the like.

Generally, the acceleration of a moving reflective member (when the reflective member is a fluid, the local acceleration) is determined by differentiating the velocity of the moving reflective member, and to ascertain the acceleration with the required degree of accuracy, the average of the results of a large number of measurements is obtained. That is to say, the velocity is determined by an integrating operation. Therefore, where the acceleration is obtained from the velocity by a differentiating operation, the effect of the integrating operation is cancelled out, making it difficult to measure the acceleration with high accuracy.

SUMMARY OF THE INVENTION

The object of the present invention is to provide an ultrasonic device for measuring the acceleration of a moving reflective member which measures and indicates in real time and at high accuracy the acceleration of a moving reflective member without differentiating the velocity of the moving reflective member obtained by integration.

The present invention provides an ultrasonic device for measuring the acceleration of a moving reflective member which comprises a complex signal converter for transmitting a periodic pulse modulated wave into a living organism, receiving a reflected signal from a moving reflective member in the living organism and converting the received signal into a complex signal, and an acceleration measurement means having a plurality of complex delay lines with delay times equal to an integral multiple of the pulse-recurrence period, the acceleration measurement means calculating the acceleration of the moving reflective member from the signals output by the complex signal converter and the signals output by the complex delay lines.

The acceleration measurement means may be constituted using a triple-complex multiplication circuit which calculates the triple-product of the complex signal by first calculating the multiplied product of the complex signal output by the complex signal converter and then on the basis of the complex signal representing the resulting multiplied product calculates the multiplied product between this and a conjugate complex signal which has been delayed by a prescribed number of periods. In this case, as the argument of the triple-complex product includes the acceleration, the acceleration can be calculated from the argument.

Alternatively, the acceleration measurement means may be constituted using a velocity calculating circuit and an acceleration calculating circuit. In this case, the multiplied product of the complex signal is calculated by the velocity calculating circuit and the velocity of the moving reflective member is calculated from the argument of the multiplied product. For obtaining the acceleration of the moving reflective member, the difference between the velocity signal for the present time and a velocity signal that has been delayed by an integral number of pulse periods is calculated. The resulting difference signal represents the acceleration.

In the foregoing explanation, the multiplied product should be understood to include both the complex product and the conjugate product.

DESCRIPTION OF THE PREFFERED EMBODIMENTS

Figures 1, 1A:
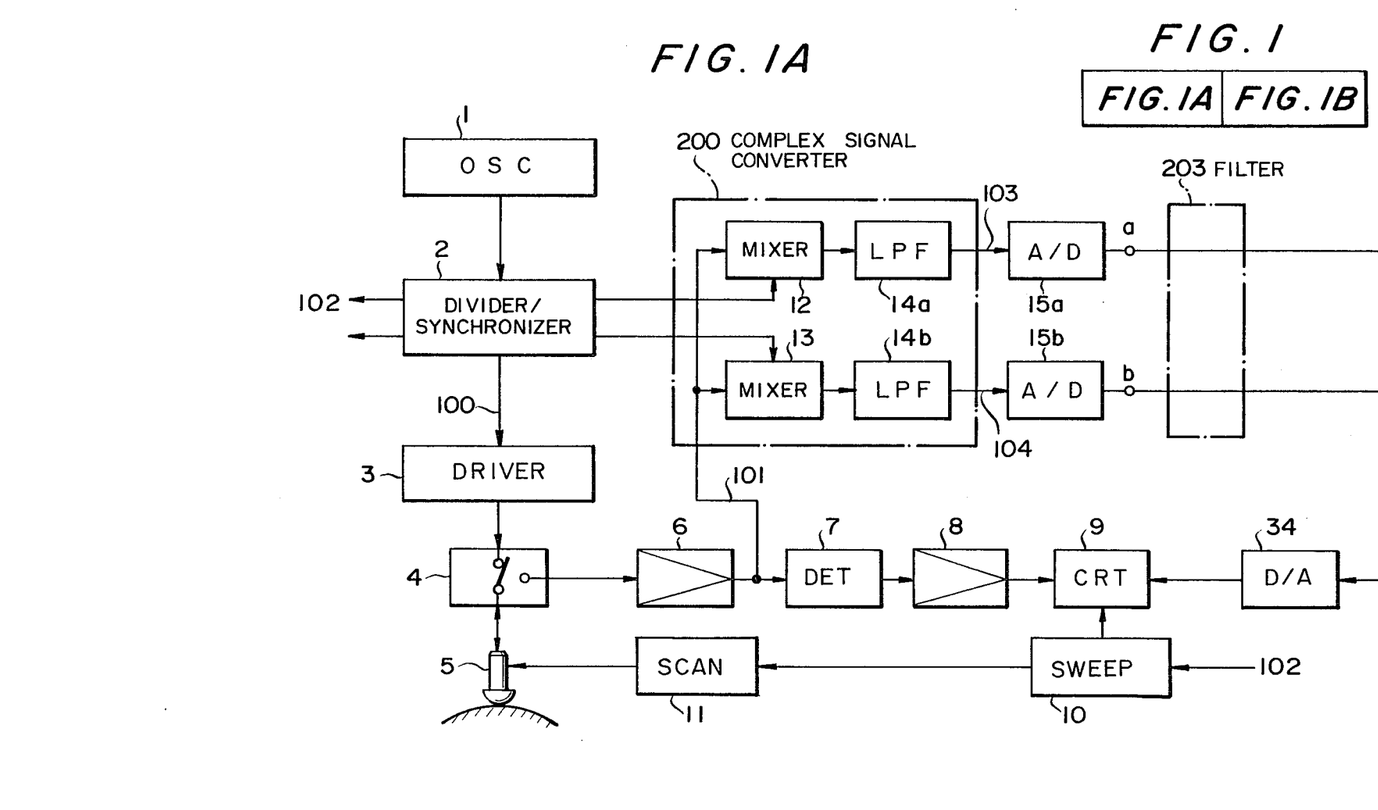
FIGS. 1A and 1B are block diagrams, schematically illustrating a first embodiment of the ultrasonic device for measuring the acceleration of a moving reflective member according to the present invention.
Figure 1B:
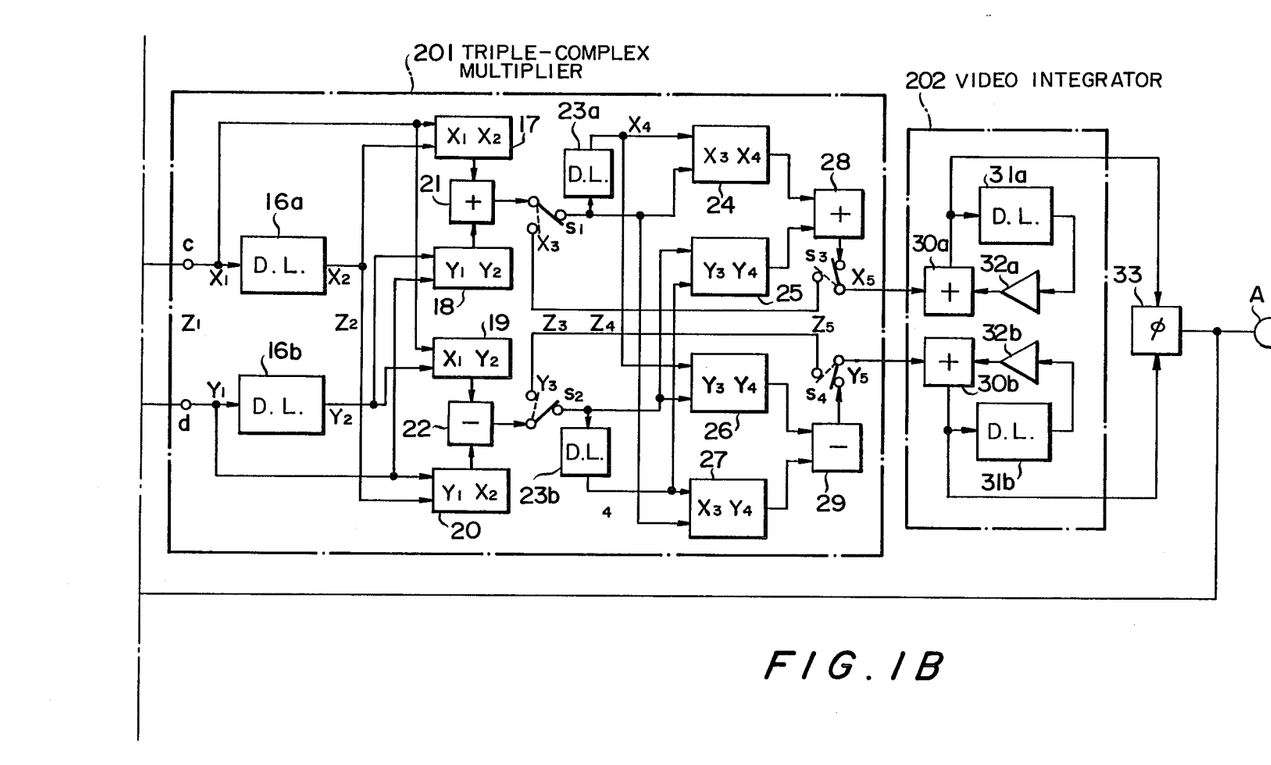

FIGS. 1A and 1B, show a first embodiment of a device employing ultrasonic waves for measuring and displaying the velocity of blood flowing within a living organism to which the present invention has been applied. A stable high-frequency signal generated by an oscillator 1 is supplied to a frequency divider and synchronization circuit 2, which outputs such various synchronization signals required by the device as a pulse-recurrence signal, a clock pulse signal, a reference wave signal and a driving pulse signal.

Thus a driving pulse signal 100 is sent to a driving circuit 3 from where it is output at a predetermined recurrence frequency (4 kHz, for example) and, after passing through a transmit/receive switch 4, is applied to a probe 5, where it is converted into an ultrasonic wave and transmitted into a living organism as ultrasonic wave pulses. The ultrasonic wave thus transmitted into the living organism is reflected by one or more moving reflective members within the living organism and the reflected wave is received by the probe 5 after a time delay proportional to the distance between the moving reflective member and the probe 5. Upon receiving the reflected ultrasonic wave, the probe 5 converts it into an electric signal. This electric signal is sent via the transmit/receive switch 4 to a high-frequency amplifier 6 which outputs it as an amplified signal 101 and also forwards it to an envelope detector 7. The detection signal from the envelope detector 7 is a video signal which is input to a display 9 after being amplified by an amplifier 8 and brilliance-modulates the CRT (cathode ray tube) of the display 9.

On the other hand, a synchronization signal 102 sweep-synchronized with the transmitted pulses is output to a sweep circuit 10 by the frequency divider and synchronization circuit 2. Thus the electron beam of the CRT is swept in accordance with the signal output by the sweep circuit 10, whereby a cross-sectional image of the living organism is displayed in B mode, or alternatively in M mode by halting the beam scanning in a predetermined direction. Meanwhile, the output of the sweep circuit 10 is also input to a scanning controller 11 which in turn electronically or mechanically controls the ultrasonic wave beam transmitted by the probe 5.

What characterizes the first embodiment of the invention is that the product of the multiplied product which serves as the basis for the velocity computation and the conjugate complex signal for one period earlier is calculated, i.e. a triple-complex product is obtained, and the acceleration component contained in this triple-complex product is computed from the argument of the triple-complex product using a specific formula. The process for obtaining the aforesaid multiplied product serving as the basis for the velocity calculation is approximately the same as that employed in conventional velocity calculators.

More specifically, the received high frequency signal is input to a complex signal converter 200 for conversion into a complex signal and the output signal 101 from the high-frequency amplifier 6 is applied to each of two mixers 12 and 13. The spectrum of the high-frequency signal consists of a large number of line spectra each having a frequency equal to an integer multiple of the pulse-recurrence frequency. As is well known, if the reflective member is moving, the received frequency will be changed by the Doppler effect. For simplifying the explanation of the change that occurs in the received frequency, consideration will be given to a line spectrum located near the center of the spectrum and having a frequency $f_0$. In this case, defining the frequency which has been changed by the Doppler effect as $f_d$, and defining the amplitude as 1 (here and hereinafter), the received high-frequency signal can be represented by, $$\cos 2\pi (f_0 - f_d) t \quad (1)$$

As is well known, in the case where the direction of movement of the reflective member and the angle between the transmitted beam and the reflective member are constant, the Doppler frequency $f_d$ is proportional to the velocity v and the frequency of the transmitted wave $f_0$, so that the following equation holds, $$f_d = k f_0 v \quad (2)$$

In this specification, v will be defined as positive for movement of the moving reflective member away from the probe and negative for movement toward the probe.

Equation (2) represents the Doppler effect in the case where there is no acceleration and must be modified as follows in the case where the reflective member is moving at an acceleration of $\alpha$ and a velocity of v, $$f_d = k f_0 (v + \alpha t) \quad (3)$$

The frequency divider and synchronization circuit 2 outputs a continuous wave $f_0$ of a frequency that is an integral multiple of the pulse-recurrence frequency and this continuous wave $f_0$ is input to the other input terminal of each of the mixers 12 and 13 as a reference wave. The two reference waves are 90° out of phase with each other and can be expressed by, $$\cos 2\pi f_0 t \quad (4)$$

$$\sin 2\pi f_0 t \quad (5)$$

so that the product of equation (1) and equation (4) can be obtained from the mixer 12, which produces the output, $$\cos 2\pi f_d t + \cos 2\pi (2f_0 - f_d) t \quad (6)$$

This output from the mixer 12 is sent to a low pass filter 14a which removes the $2f_0$ frequency component, so that the output 103 from the low pass filter 14a is, $$\cos 2\pi f_d t \quad (7)$$

Similarly, the output 104 from a low pass filter 14b which receives the output of the mixer 13 is, $$\sin 2\pi f_d t \quad (8)$$

From the equations (7) and (8) can be obtained the following complex equation, $$\cos 2\pi f_d t + i \sin 2\pi f_d t = X_1 + i Y_1 = Z_1 \quad (9)$$

where i represents the complex symbol, and $X_1$ and $Y_1$ are as follows, $$X_1 = \cos 2\pi f_d t \quad (10)$$

$$Y_1 = \sin 2\pi f_d t \quad (11)$$

The complex signal $Z_1$ thus produced by the complex signal converter 200 is input to A/D converters 15a and 15b, where it is converted to a digital signal for the purpose of enhancing the computational accuracy. Next in order to obtain the acceleration, the complex signal $Z_1$ is then sent to a triple-complex multiplier 201 which carries out triple-complex multiplication. First the real number component $X_1$ and the imaginary number component $Y_1$ of the complex number $Z_1$ are input to a delay line 16a and a delay line 16b, respectively, where they are delayed by a time T equal to one recurrence period of the transmitted pulse. The complex delay lines 16a, 16b can be consitituted as digital delay lines using shift registers, memories arranged to read out data one cycle after it is written in, or the like.

Representing the phase of the complex signal $Z_1$ using equations (3), (9), (10) and (11), we have, $$Z_1 = \cos 2\pi k f_0 (vt + \tfrac{1}{2}\alpha t^2) + i \sin 2\pi k f_0 (vt + \tfrac{1}{2}\alpha t^2) \quad (12)$$

and further, $$Z_1 = \cos\phi_1 + i\sin\phi_1 \quad (13)$$
$$= X_1 + iY_1$$

whereby can be obtained, $$\phi_1 = 2\pi k f_0(vt + \tfrac{1}{2}\alpha t^2) \quad (14)$$

Here defining the combined outputs $X_2$ and $Y_2$ of the complex delay lines 16a and 16b as $Z_2$, this $Z_2$ is a signal delayed by one period T with respect to the complex signal $Z_1$ and can be represented as, $$Z_2 = X_2 + iY_2 \quad (15)$$
$$= \cos\phi_2 + i\sin\phi_2$$

$$\phi_2 = 2\pi kf_0\{v(t-T) + \tfrac{1}{2}\alpha(t-T)^2\} \quad (16)$$

The real number component $X_2$ and the imaginary number component $Y_2$ of the complex signal $Z_2$ are input to multipliers 17, 18, 19 and 20, and are multiplied with the real number component $X_1$ and imaginary number component $Y_1$ of the complex signal $Z_1$ which is also input to these multipliers, whereby there are obtained the products of $X_1$ and $X_2$, $Y_1$ and $Y_2$, $X_1$ and $Y_2$, and $Y_1$ and $X_2$. The outputs of the multipliers 17 and 18 are input to an adder 21, and the outputs of the multipliers 19 and 20 are input to a subtracter 22, the adder 21 producing an output of $X_1X_2 + Y_1Y_2$ and the subtracter 22 producing an output of $Y_1X_2 - X_1Y_2$.

In this way, there is calculated the conjugate product $Z_1Z_2^*$ of the complex signal $Z_1$ and the conjugate complex signal $Z_2^*$ of the complex signal $Z_2$, which can be expressed as complex signal $Z_3$ as follows, $$Z_3 = Z_1 Z_2^* \quad (17)$$
$$= (X_1 + iY_1)(X_2 - iY_2)$$
$$= X_1X_2 + Y_1Y_2 + i(Y_1X_2 - X_1Y_2)$$
$$= X_3 + iY_3$$

Here, rewriting the equation (17) using the equations (13) and (15), $Z_3$ can be expressed as, $$Z_3 = \cos\phi_1\cos\phi_2 + \sin\phi_1\sin\phi_2 + i(\sin\phi_1\cos\phi_2 - \cos\phi_1\sin\phi_2) \quad (18)$$

and further as, $$Z_3 = \cos(\phi_1-\phi_2) + i\sin(\phi_1-\phi_2) \quad (19)$$

And if this is rewritten, $$Z_3 = \cos\phi_3 + i\sin\phi_3 \quad (20)$$
$$= X_3 + iY_3$$

then from the equations (14) and (15), it follows that, $$\phi_3 = \phi_1 - \phi_2 \quad (21)$$
$$= 2\pi kf_0\{vT + \alpha Tt - \tfrac{1}{2}\alpha T^2\}$$

The multiplied product obtained in this manner constitutes a complex signal that can serve as the basis for determining the velocity of the moving reflective member. In this invention, however, for the purpose of determining the acceleration, this signal is processed after being delayed by one more period. More specifically, the signals representing the real component $X_3$ and the imaginary component $Y_3$ of the complex signal (multiplied product) $Z_3$ are input through switches $S_1$ and $S_2$(as set at the solid line positions) to complex delay lines 23a and 23b, respectively, where they are converted to signals delayed by one period T and output from the complex delay lines 23a, 23b to multipliers 24, 25, 26 and 27. Meanwhile, the real number component $X_3$ and the imaginary number component $Y_3$ of the complex signal $Z_3$ are input without modification to the multipliers 24, 25, 26 and 27, where they are multiplied with the aforesaid outputs of the complex delay lines 23a and 23b. Designating the outputs of the complex delay lines 23a, 23b as complex signal $Z_4$ and the real number and imaginary number components of this complex signal $Z_4$ as $X_4$ and $Y_4$, the outputs of the multipliers 24, 25, 26 and 27 become $X_3X_4$, $Y_3Y_4$, $Y_3X_4$, and $X_3Y_4$, respectively. The outputs of the multiplier 24 and the multiplier 25 are input to an adder 28, while the outputs of the multiplier 26 and the multiplier 27 are input to a subtracter 29, whereby there is obtained a triple-complex signal $Z_5$ which represents the triple-complex product of the received high-frequency signal.

The complex signal $Z_4$ can be written as, $$Z_4 = \cos\phi_4 + i\sin\phi_4 = X_4 + iY_4 \quad (22)$$

and the argument $\phi_4$ as, $$\phi_4 = 2\pi kf_0\{vT + \alpha T(t-T) - \tfrac{1}{2}\alpha T^2\} \quad (23)$$

The triple-complex signal $Z_5$ becomes, $$Z_5 = Z_3 \cdot Z_4^* = Z_1 \cdot Z_2^* \cdot Z_4^* \quad (24)$$
$$= \cos\phi_5 + i\sin\phi_5$$
$$= X_5 + iY_5$$

whereby there is obtained the product of the complex signals $Z_3$ and $Z_4$ and the conjugate complex signal $Z_4^*$, i.e. the triple-complex product.

Here, in view of the relationship, $$\phi_5 = \phi_3 - \phi_4 = 2\pi kf_0\alpha T^2 \quad (25)$$

it is possible to derive the acceleration from this equation (25).

Figure 2:
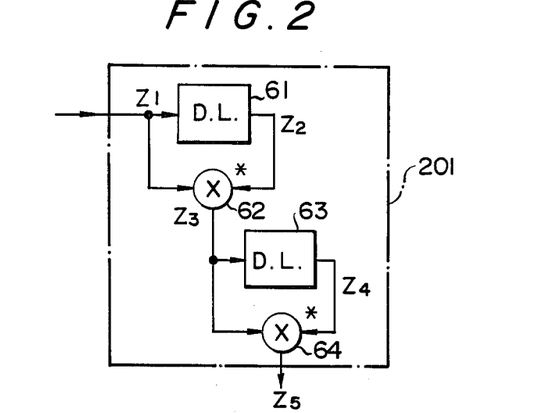
FIG. 2 is a block diagram schematically illustrating a triple-complex multiplier.

A block diagram is shown in FIG. 2 for simplifying the explanation of the triple-complex multiplier 201. In this figure, the complex delay line 61 corresponds to the complex delay lines 16a and 16b in FIG. 1, and the complex multiplier 62 to the multipliers 17 to 20, the adder 21 and the substracter 22 in FIG. 1, the complex delay line 63 to the complex delay lines 23a and 23b in FIG. 1, and the complex multiplier 64 to the complex multipliers 24 to 27, the adder 28 and the substracter 29 in FIG. 1. From FIG. 2 it will therefore be understood that the triple-complex signal $Z_5$ is the product obtained by multiplying the conjugate signal of the complex signal $Z_1$ and the complex signal $Z_2$, with the conjugate complex signal of the complex signal $Z_4$.

Figure 3:
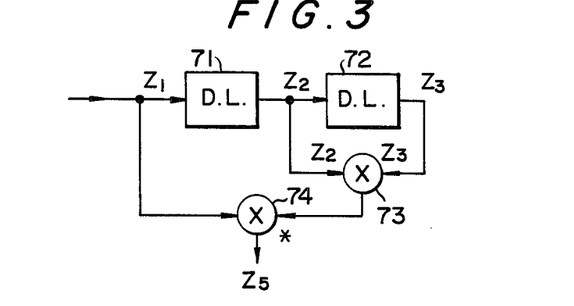
FIG. 3 is a block diagram schematically illustrating another arrangement of a triple-complex multiplier.

Alternatively, the triple-complex product can be obtained with the arrangement shown in FIG. 3, wherein the triple-complex signal $Z_5$ is the triple-complex product obtained by multiplying the complex signal $Z_1$ with the conjugate complex signal of the complex products $Z_2$ and $Z_3$. Needless to say, the complex delay lines 71 and 72 and the the complex multipliers 73 and 74 in this figure are of the same structure as the complex delay lines 61 and 62 and the complex multipliers 62 and 64 in FIG. 2.

As the triple-complex signal $Z_5$ obtained in this manner generally includes an irregular component, for obtaining a high-accuracy measurement the triple-complex signal $Z_5$ is input to a video integrator 202 which constitutes an averaging circuit. The video integrator 202 consists of adders 30a and 30b, delay lines 31a and 31b, and weighting circuits 32a and 32b. In the adders 30a and 30b, the outputs which have been delayed one period by the delay lines 31a and 31b and the current input signal are added, and the sums are sent back to the delay lines 31a and 31b, whereafter the operation is repeated. If this addition is carried out using digital circuits, for example, it is possible to obtain the average by outputting only the most significant bit of the result of the addition.

If this operation is simply repeated over and over, however, the output will grow larger with increasing number of repetitions until saturation is reached. Therefore, this embodiment is provided with the weighting circuits 32a and 32b which serve to attenuate the output before adding it to the input. More specifically, defining the amount of attenuation as $\beta$, if, for example, the signal ten periods earlier than the current signal is attenuated by a factor of $\beta$ to the power of ten before being added to the current signal, the effect on the output will be small and it will become possible to obtain the same averaging effect as can be had with a low pass filter or a moving average circuit. Moreover, by varying the amount of weighting, it is possible to vary the degree of averaging.

Thus, in the device according to the present invention the real number component $X_5$ and the imaginary number component $Y_5$ of the triple complex signal $Z_5$ are averaged as described in the foregoing and then input to an argument calculator 33 where the argument $\phi_5$ of the triple-complex signal $Z_5$ is calculated. This argument $\phi_5$ can be derived from the equation 25 by the following equation, $$\phi_5 = \tan^{-1} \frac{Y_5}{X_5} = 2\pi k f_0 \alpha T^2 \qquad (26)$$

In the equation (26), since the transmitted frequency $f_0$ and the pulse-recurrence period T are fixed, it is possible after obtaining the argument $\phi_5$ to obtain the acceleration $\alpha$ from the following equation, $$\alpha = \frac{\phi_5}{2\pi k f_0 T^2} \qquad (27)$$

Regarding the calculation according to equation 26, it is possible to prepare a table of the values assumable by the real number portion $X_5$ and the imaginary number portion $Y_5$ as well as the values of the argument $\phi_5$ corresponding to these assumable values, and then to write the resulting table into a read-only memory (ROM), whereby it will become possible to obtain the value of the argument $\phi_5$ from the values of the real number portion $X_5$ and the imaginary number portion $Y_5$ almost instantaneously. Moreover, as the value of the argument $\phi_5$ can be measured both between 0° and +180° and between 0° and −180°, it is possible to discriminate between positive and negative values of the acceleration $\alpha$.

The argument signal $\phi_5$ obtained in the foregoing manner is output from terminal A in FIG. 1 for use in various measurements and computations. In the present embodiment it is also converted to an analog signal by a D/A converter 34 and used to modulate the brilliance of the image produced by the CRT display 9 in proportion to the acceleration.

Therefore, the acceleration along the axis of the transmitted beam can be displayed in either M mode or B mode, and in the present embodiment, since an ordinary image signal from the amplifier 8 and the aforesaid acceleration signal can be selectively displayed on the CRT display 9 either separately or simultaneously, there is the advantage from the diagnostic point of view that the movement of the blood flow and the surrounding tissue and structure can be viewed in relation to each other. Observation of this relationship can be made even easier by using a color CRT and displaying the acceleration signal in color.

In FIG. 1, the switches $S_1$, $S_2$, $S_3$ and $S_4$ are set at the positions shown by the solid lines for calculating the triple-complex product in order to obtain the acceleration in the manner described in the foregoing. If these switches are instead switched to the broken line positions, there can be obtained the argument $\phi_3$ of the complex number $Z_3$. As will be understood from the equation 21, the argument $\phi_3$ is proportional to the velocity when there is no acceleration so that it can be used as a velocity signal. Thus by choosing the position of these switches it is possible to selectively carry out velocity measurement or acceleration measurement. Needless to say, separate circuitry can be provided for deriving the argument $\phi_3$, in which case both measurements can be carried out simultaneously.

Figure 4:
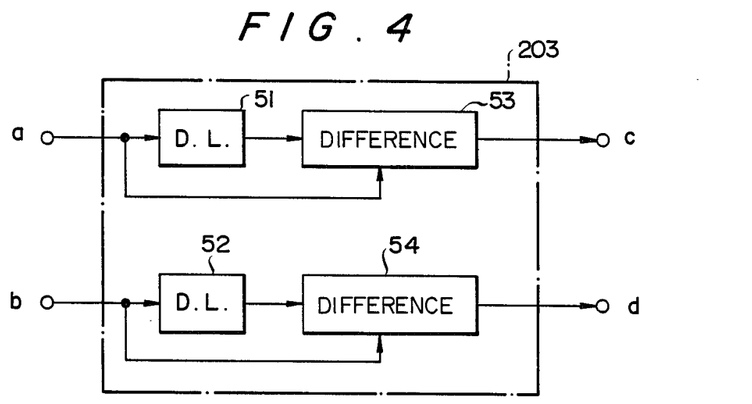
FIG. 4 is a block diagram schematically illustrating a clutter filter.

In this embodiment a clutter filter 203 is further provided between terminals a and c and between terminals b and d in FIG. 1, for the purpose of removing signals received from stationary or slow moving members within the living organism. More specifically, when a signal such as a blood flow signal is received from a living organism it is generally accompanied by reflection signals from the blood vessel wall, heart wall and other approximately stationary tissues of the living organism (these reflection signals being referred to as "clutter"), and since this clutter is ordinarily much stronger than the reflection signal from the blood flow, it becomes major hindrance to blood flow measurement. Thus, by providing the clutter filter 203 to effectively remove this clutter, it becomes possible to greatly upgrade the quality of the image signal. As shown in FIG. 4, the clutter filter 203 consists of delay lines 51 and 52 each having a delay time equal to one period of the pulse signal, and difference calculators 53 and 54. With this arrangement, the difference between the current signal and that one period earlier is successively calculated and since the difference for signals relating to waves reflected from stationary members is substantially zero these signals are removed. In the case of reflection signals from slow moving members such as the heart wall, the output is greatly reduced so that the effect thereof on the blood flow signal is reduced.

Moreover, in a device that maintains signal amplitude constant by use of automatic gain control (AGC) or the like, when the acceleration is small, $\phi_5$ in equation 26 is also small, and as a result $\cos \phi_5 \simeq 1$ and $\sin \phi_5 \simeq \phi_5$, so that the imaginary number portion of $Z_5$ itself represents the argument $\phi_5$. Therefore, it is possible to simplify the structure of the device even further by omitting the structural elements used for calculating $X_5$, namely the multipliers 24 and 25 and the adder 28, and using the output of the subtracter 29 in place of the output of the argument calculator 33.

Further, by providing a circuit of the same structure as the video integrator 202 on the output side of the adder 21 and the subtracter 22, the noise component of the signal can be reduced and the signal quality further enhanced.

Second embodiment:

A second embodiment of the invention will now be described with reference to FIG. 5. What characterizes the second embodiment is that it employs a simplified circuit as the means for measuring the acceleration and that after obtaining the multiplied product of the complex signal, which multiplied product represents the velocity, the acceleration is derived from the argument of the multiplied product. In other words, instead of calculating the triple-complex product as in the first embodiment, there is simply carried out a computation to determine the difference between two signals which have a predetermined difference in period in the argument of the multiplied product.

Figure 5:
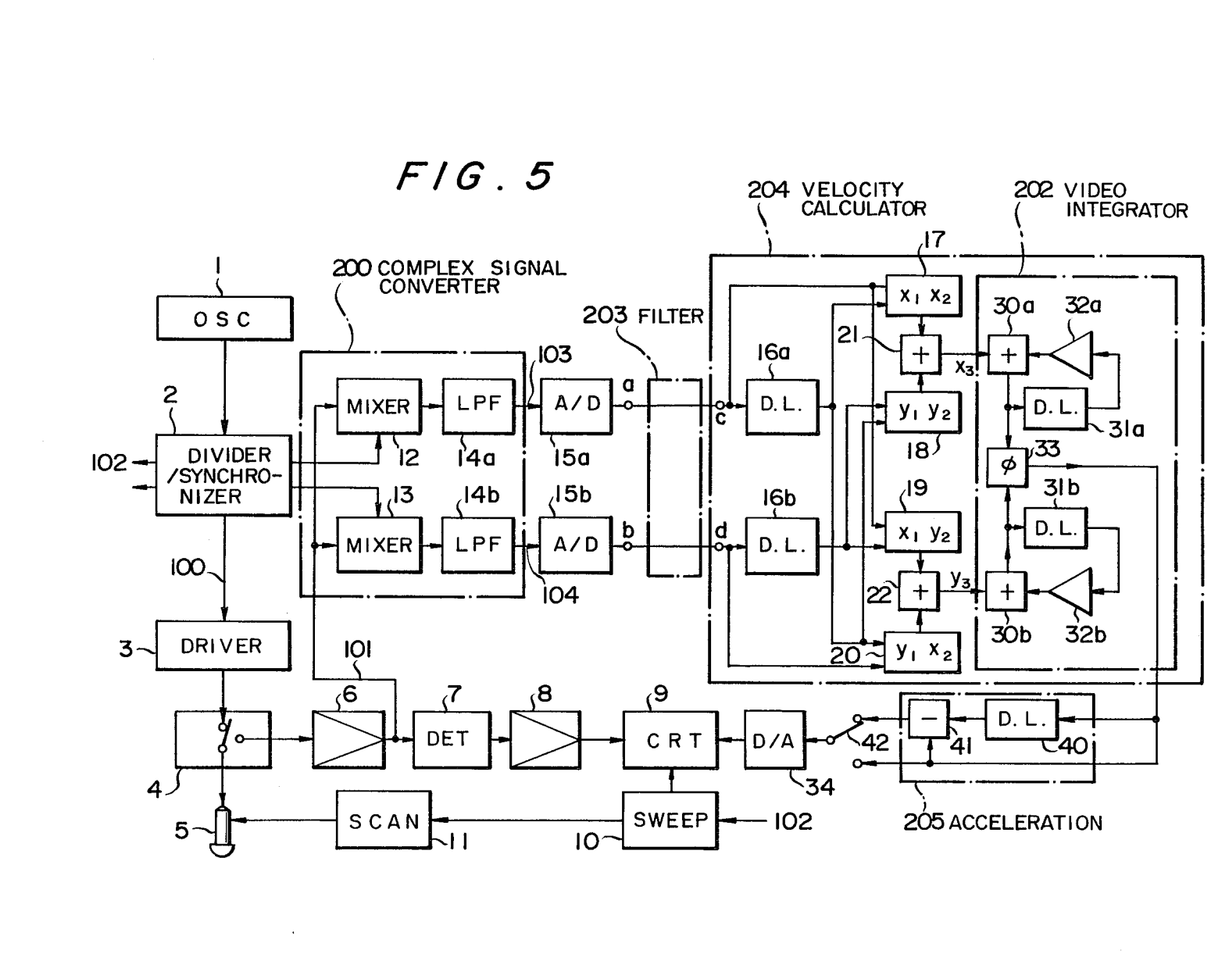
FIG. 5 is a block diagram schematically illustrating a second embodiment of the invention.

In FIG. 5 the circuit for computing the multiplied product is the same as that in FIG. 1 and for this reason no explanation will be made of the processing carried out up to the adder 21 and subtracter 22, which in this embodiment constitute parts of a velocity calculator 204.

First, the velocity calculator 204 conducts a calculation to obtain the argument of the multiplied product (conjugate product) of the complex signal, i.e. it carries out a velocity calculation, and the argument calculator calculates the aforesaid argument $\phi_3$ on the basis of the following equation, $$\phi_3 = \tan^{-1} \frac{Y_3}{X_3} \tag{28}$$

As the argument $\phi_3$ is proportional to the velocity when acceleration $\alpha=0$, it consititutes a moving reflective member velocity signal which in this embodiment is used to calculate the acceleration. In order to obtain a highly accurate velocity signal, this embodiment has a video integrator 202, which serves as an averaging circuit, connected to the output of the adder 21 and the subtacter 22. The structure and operation of this video integrator is the same as the one in the first embodiment, and its function is to carry out signal averaging by repeatedly adding an output delayed by one period to the current input signal.

The argument $\phi_3$ of the multiplied product obtained in this way is the velocity signal shown by the equation 21 and can be used for obtaining the acceleration. More specifically, the output from the argument calculator 33 is input to an acceleration calculator 205 which is constituted of a delay line 40 for delaying the velocity signal by a time equal to an integral multiple of the pulse period, and a difference calculator 41. The difference calculator 41 calculates the difference between the signal being input to the delay line 40 at that time and the signal being output by the delay line 40, which is the velocity signal a prescribed number of pulse periods earlier. The output of the difference calculator 41 corresponds to the change in the velocity component and can be used for obtaining the acceleration.

As for representing the operation of the acceleration calculator mathematically, if the delay time of the delay line 40 is defined as being equal to the pulse-repetition period T, then the output of the delay line 40 can be represented by, $$\phi_4 = 2\pi k f_0 \{VT + \alpha T(t-T) - \alpha T^2/2\} \tag{29}$$

Further, the calculation of $\phi_3 - \phi_4 = \phi_5$ is carried out by the difference calculator 41 and from the equations 28 and 29, the output of the difference calculator 41 can be represented as, $$\phi_5 = 2\pi k f_0 \alpha T^2 \tag{30}$$

Since the pulse-recurrence period T in the equation (30) is fixed, it is therefore possible to calculate the acceleration $\alpha$ from the argument $\phi_5$.

Moreover, since the acceleration $\alpha$ is as defined by the following equation, the difference calculator 41 can be constitituted as a ROM, whereby it becomes possible to directly obtain the acceleration $\alpha$.

$$\alpha = \frac{\phi_5}{2\pi k f_0 T^2} \tag{31}$$

More specifically, it is possible to prepare a table of the values of the acceleration $\alpha$ corresponding to the values of $\phi_5$ and then to write the resulting table into a read-only memory (ROM), whereby it will become possible to read out the value of the acceleration $\alpha$ directly from the value of the argument $\phi_5$. Moreover, as the value of the argument $\phi_5$ can be measured both between 0° and +180° and between 0° and −180°, it is possible to discriminate between positive and negative values of the acceleration $\alpha$.

In the present embodiment the argument signal obtained in the foregoing manner is converted to an analog signal by a D/A converter 34 and used to modulate the brilliance of the image produced by the CRT display 9 in proportion to the acceleration.

As described in the foregoing, in accordance with the present invention, it is possible to derive the acceleration from a received Doppler signal containing acceleration information without directly differentiating a velocity signal.

Further, in accordance with one aspect of the invention wherein the triple-complex product is calculated and the acceleration is derived from the argument of this triple-complex product, the acceleration measurement can be carried out with high accuracy and, moreover, since the time delay involved in calculating the triple-complex product is merely a period of time equivalent to an integral multiple of the pulse-recurrence period, it is possible measure and display the acceleration substantially in real time.

Moreover, in accordance with another aspect of the invention wherein there is derived from the received Doppler signal an argument which constitutes a signal representing the velocity of the moving reflective member and the acceleration is derived from the difference between two such arguments, the acceleration can be obtained without directly differentiating the velocity signal and the acceleration calculator can be constituted simply using a delay line or the like, so that it is possible to provide an acceleration measurement device of simplified structure.

Also, in accordance with the present invention, since it is possible to continuously obtain the acceleration of the moving member on the line of passage of the transmitted and received pulses along the axis of the transmitted beam as well as to obtain the velocity distribution, it is possible to simultaneously display an image of the acceleration and velocity information together with an image of conventional positional information, whereby it is possible to obtain very high accuracy information regarding the moving reflective member.

I claim:

1. An ultrasonic device for measuring the acceleration of a moving reflective member which comprises a complex signal converter means for transmitting a periodic pulse modulated wave into a living organism, receiving a reflected signal from a moving reflective member in the living organism and converting the received signal into a complex signal, and an acceleration measurement means having a plurality of complex delay lines with delay times equal to an integral multiple of the pulse period, said acceleration measurement means for calculating the acceleration of the moving reflective member from the signals outputted by the complex signal converter means and the signals outputted by the complex delay lines, said acceleration measurement means comprising a triple-complex multiplier means for calculating the triple complex product of a complex signal outputted by said complex signal converter means.

2. An ultrasonic device for measuring the acceleration of a moving reflective member according to claim 1, further comprising an averaging circuit for averaging the output of the triple-complex multiplier means.

3. An ultrasonic device for measuring the acceleration of a moving reflective member according to any of claims 1 or 2, further comprising a clutter filter means to which the complex signal from the complex signal converter means is input for removing undesirable clutter components therefrom.

4. An ultrasonic device for measuring the acceleration of a moving reflective member according any of claims 1 or 3, further comprising a color CRT display means which is brilliance-modulated for displaying the degree of reflection of the moving reflective member and for displaying the rate of acceleration in corresponding colors.

* * * * *